US005333102A

United States Patent [19]

Oberman et al.

[11] Patent Number: 5,333,102

[45] Date of Patent: Jul. 26, 1994

[54] THEATRICAL SEARCH LIGHTING SYSTEM

[76] Inventors: Dave Oberman, 3609 Paseo del Campo, Palos Verdes Estates, Calif. 90274; Richard J. Ramano, 2478 Peacock La., Corona, Calif. 91720

[21] Appl. No.: 154,165

[22] Filed: Nov. 17, 1993

[51] Int. Cl.$^5$ ........................ F21V 21/00; G03B 15/02

[52] U.S. Cl. .................................... 362/382; 362/282; 362/284; 362/428; 362/272; 362/286

[58] Field of Search ............... 362/286, 287, 294, 277, 362/273, 404, 367, 284, 282, 278, 373, 418, 221, 233, 382, 272

[56] References Cited

U.S. PATENT DOCUMENTS

| | | | |
|---|---|---|---|
| 4,827,386 | 5/1989 | Mackiewicz | 362/373 |
| 4,931,916 | 6/1990 | Callahan | 362/284 |
| 5,136,493 | 8/1992 | Straus | 362/373 |
| 5,177,404 | 1/1993 | Cohen et al. | 362/221 |

*Primary Examiner*—Ira S. Lazarus
*Assistant Examiner*—Thomas M. Sember

[57] ABSTRACT

What is described is a compact, light weight and relatively small theatrical search lighting system which includes a frame having a rectangular base and four legs which embrace a lamp and its reflector, and two containers for ballast and a data receiver. Also mounted to the frame is a scroller and a motorized mirror for reflecting the light from the lamp. The frame may be suspended from a truss, or because of two projections attached to two legs and a tail, the system may be rotated through 90 degrees and positioned in a generally vertical condition if desired.

2 Claims, 2 Drawing Sheets

THEATRICAL SEARCH LIGHTING SYSTEM

TECHNICAL FIELD

The present invention relates to a theatrical search lighting system, and more particularly, to a lighting system which is relatively small, compact and light weight, weatherproofed and easily maintained.

BACKGROUND ART

Theatrical search lighting systems are used by performers as part of their entertainment, and over the years these systems have gotten relatively complicated and extensive. Lighting with its change of color and movement is now an integral part of the visual entertainment value for many star performers.

It is common for many performers to move from one venue to another, performing for a relatively short period of time before moving to yet another venue. Hence, prior to giving a performance at a particular venue, the lighting equipment must be transported, unloaded and set up quickly and efficiently. Once the performance at that venue has been completed the reverse process of disassembly, reloading and transportation to the next venue must be done quickly and efficiently. Hence, there is a consistent need to provide high quality lighting in a manner which facilitates transportation, assembly and disassembly.

OBJECTS OF THE INVENTION

An object of the present invention is to have a theatrical search lighting system which is relatively small in size and light in weight.

Another object of the present invention is to have a theatrical search lighting system which is weather proof.

Yet another object of the present invention is to have a theatrical search lighting system with sub-assemblies that are easily removed and attached.

Still another aspect of the invention is to have a lighting system including a simple frame for compactly packaging the various lighting components.

The foregoing objects and corresponding advantages, features and results of the present invention, together with various other objects, advantages, features and results thereof which will be evident to those skilled in the art in light of this disclosure, may be achieved with the exemplary embodiment of the invention described in detail hereinafter, and illustrated in the accompanying drawings.

BRIEF SUMMARY OF THE INVENTION

The system comprises a frame having a rectangular base; four legs extending from the base; two support beams, each connecting a pair of the legs; two projections, each connected to a respective leg; and an elongated top beam connected to the base and extending beyond the base; a light source connected to the frame and position between the base and the four legs; and a mirror connected to the extended portion of the elongated top beam.

DETAILED DESCRIPTION

Figure 1:
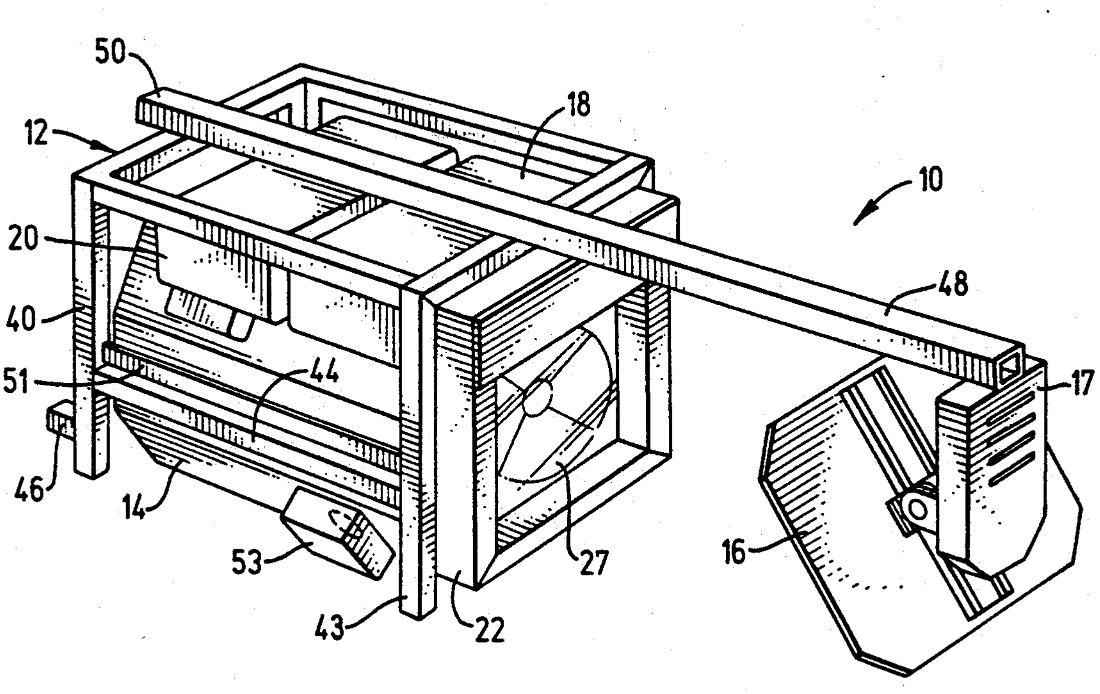
FIG. 1 is a perspective view of a light, mirror and frame generally positioned as it would be suspended from a truss.

While the present invention is susceptible of various modifications and alternative constructions, an embodiment is shown in the drawings and will herein be described in detail. It should be understood, however, that it is not the intention to limit the invention to the particular form disclosed; but on the contrary, the intention is to cover all modifications, equivalencies and alternative constructions falling with the spirit and scope of the invention as expressed in the appended claims.

Referring now to FIG. 1, the preferred embodiment of a theatrical search lighting system 10 is shown and will be described in detail. Generally, the system is suspended from an overhead truss (not shown here) such as that described in U.S. Pat. No. 5,237,792. The system includes an aluminum space frame 12 to which is attached a light source 14, a movable mirror 16, a container 18, a container 20 and a scroller 22. To operate the system, a lighting control console 24 (FIG. 2) is provided as is a power source 26.

Figure 2:
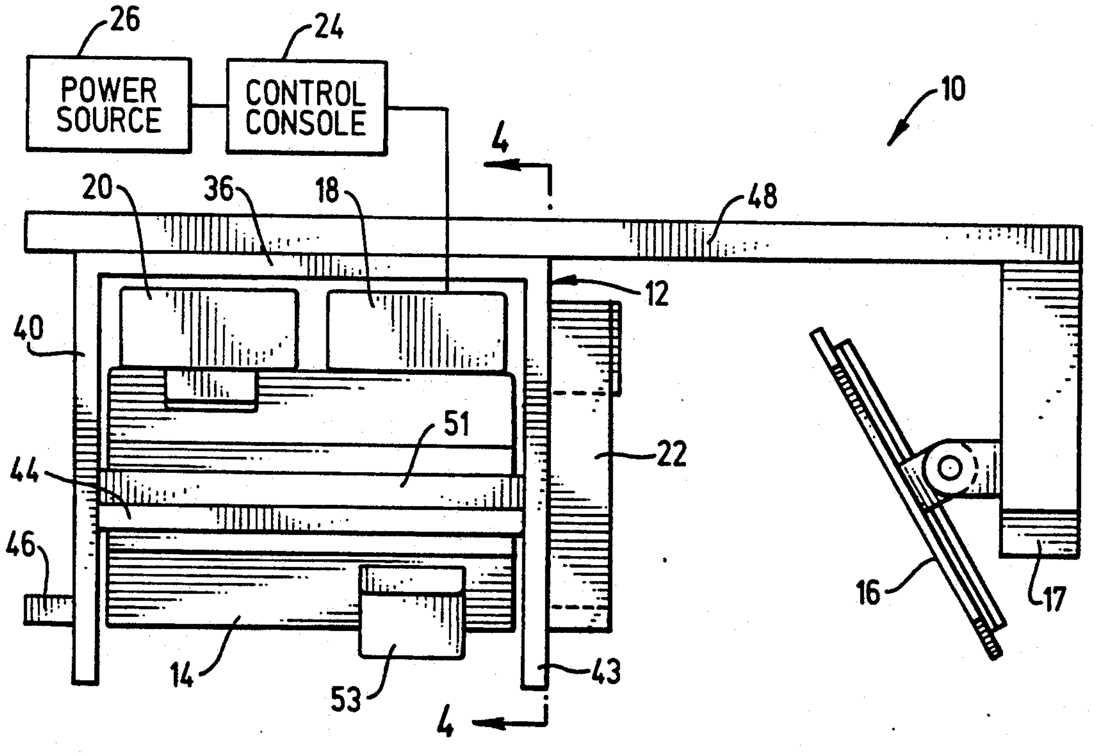
FIG. 2 is a diagrammatic side elevational view of the lighting system.

One of the advantages of the present invention is that it is relatively small in size and light in weight in relation to the brightness of the lighting that is achieved. Referring to FIG. 2, the light source 14 is a 2,000 watt xenon lamp which is mounted to and mostly enclosed by the frame 12. The xenon lamp is relatively small but quite bright. The lamp may be purchased from Optical Radiation Corp., Lamp Division of Azusa, Calif. The lamp includes a parabolic reflector 27 and a motor 28 which moves the bulb about the focal point of the reflector thereby allowing the beam to spread from columnated to 20 degrees, half angle (40 degrees cone). The reflector mechanism is available from Sky Tracker of America of Temecula, Calif.

Figure 3:
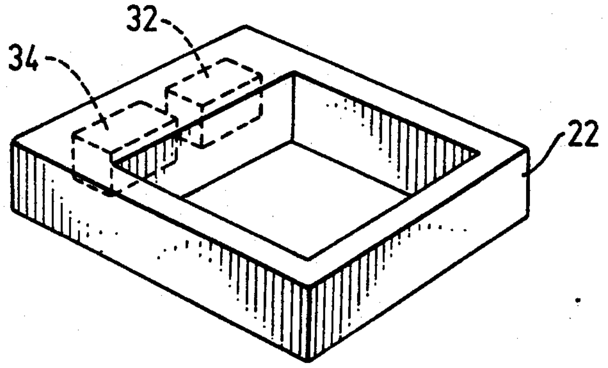
FIG. 3 is a perspective view of the scroller.

Also connected to the frame is the mirror 16 which has a servo motor mechanism 17 allowing the mirror to move such that the light beam can be directed within a range of 240 degrees × 120 degrees and that any position may be achieved in 0.25 seconds. The mirror and its motor may be purchased from Cameleon of Montreuil, France. As best shown in FIG. 2, the scroller 22 is mounted to the lamp 14 and positioned so that the light from the lamp must pass through it before striking the mirror 16. As shown in more detail in FIG. 3, the scroller 22 is a box-like structure capable of holding between 2 and 24 frames of standard gel and having the capability of end to end travel in about 1.5 seconds. The scroller has a direct drive motor 32 and a optical position feed-back system 34. The scroller may be purchased from Wybron, Inc. of Colorado Springs, Colo. and is sold under the trademark COLORAM. The scroller also includes a dowser in the form of an optical encoded DC servomotor controlled venetian blind system that is capable of dimming the light beam as well as flashing the beam at up to 10 pulses per second.

Figure 5:
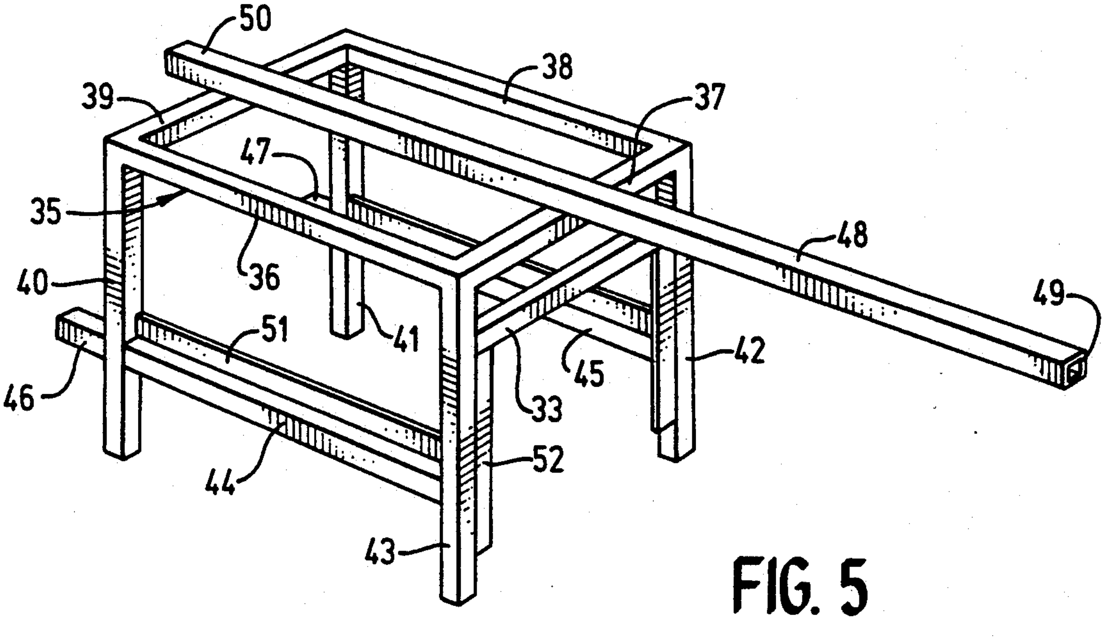
FIG. 5 is a perspective view of the frame without any components attached.

Also contributing to the small size, light weight and compact packaging is the aluminum space frame 12. The frame includes a rectangular base 35 (FIG. 5) having four square beams 36, 37, 38 and 39. Extending at right angles to the base from each corner are four legs, 40,41, 42 and 43. Two support beams 44 and 45, parallel to each other connect and stiffen a pair of legs. For example, support beam 44 connects the legs 40 and 43 while support beam 45 connects the legs 41 and 42. Another support beam 33 connects the legs 42 and 43. A projection 46 extends at right angle from the leg 40 and a similar projection 47 extends parallel to projection 46 from leg 41. Connected to the base and positioned parallel to the longitudinal axes of the frame and the support beams 44 and 45 is an elongated top beam 48 having an extend end 49 and a tail end 50. Welded to some of the beams to increase strength and add to stiffness are elongated plates such as plates 51, 52 attached to the beams 44 and 43 respectively.

To achieve compactness the light 14 is positioned between the legs 40, 41, 42 and 43, the base 35 and the support beams 44 and 45. The scroller is mounted to and supported by the legs 42 and 43; the containers 18 and 20 and positioned between the light 14 and the frame base 35. The mirror is mounted to the end 49.

Figure 4:
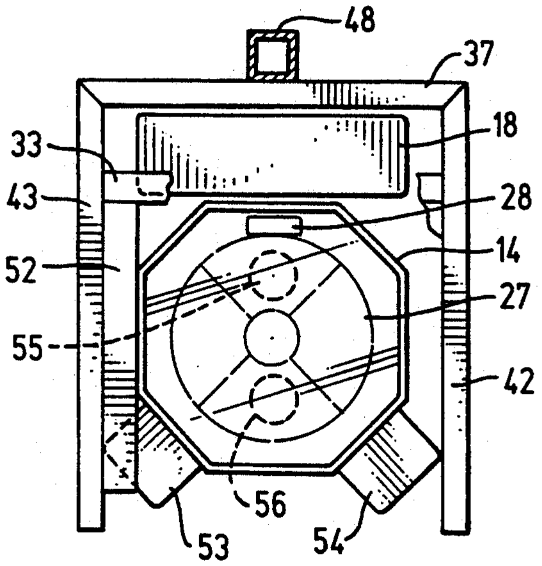
FIG. 4 is a front elevation view taken along line 4—4 of FIG. 2.

It is to be noted that the system shown in FIGS. 1, 2 and 4 assumes that it will be suspended from a truss above a stage. However, the frame is constructed so that the system can be placed in a vertical disposition if desired. In this disposition, the frame is rotated approximately 90 degrees from that shown in FIG. 1 to allow the frame to rest on projections 46 and 47 and the end 50.

The container 18 is an enclosed sealed box containing a ballast solid state switching supply while the container 20, also an enclosed sealed box, includes a data receiver. The advantages of placing these means for affecting the light in containers is that they can be easily installed and removed should there be maintenance problems, for example.

Connected to the system is the lighting control console 24 which is shown as a diagrammatic box in FIG. 2. The console may be any commercial system such as the COMPULITE ANIMATOR MLC-48/72 which is produced by Compulite of Ramat Hasbaron, Israel. Of course, to complete operation of the system, there is a need for the power source 26, FIG. 2, which also is shown as a diagrammatic box.

The light source has about it an octagon shape housing, FIG. 1, which is constructed to be weather proof. This means that the housing is sealed and air ducts are placed at the side with covers 53, 54, FIGS. 1 and 4 so that rain cannot get in. Two fans 55, 56 at the rear of the light cause ambient air to be blown across the light and exhausted beneath the covers 53, 54. The containers 18 and 20 are also box-like and sealed so as be weatherproof.

In operation, the lamp, the mirror and the scroller are attached to the frame as are the containers carrying the ballast and data receiver. What is achieved is a very compact, relatively small and lightweight unit which may be hoisted above stage level and suspended from a truss in a somewhat horizontal position, or it may be disposed in a relatively vertical position supported on the stage or platform by the frame.

As can be appreciated, the system is easily handled, relatively small in size and light in weight and is weatherproofed. In addition, the sub-assemblies carried in the containers may be easily removed and replaced.

We claim:

1. A lighting system comprising a frame having a rectangular base, four legs extending from said base, two support beams each connecting a pair of said legs, two projections each connected to a respective leg, and an elongated top beam connected to the base and extending beyond said base;

a light source connected to said frame and positioned between said base and said four legs; and a mirror connected to an extend portion of said elongated top beam.

2. A lighting system as claimed in claim 1 including; a scroller mounted to two of said legs of said frame opposite the legs having the two projections.

* * * * *